April 10, 1962 W. E. HORROCKS 3,029,103
SUN SHADE ADJUSTING CONTRIVANCES
Filed Oct. 31, 1961
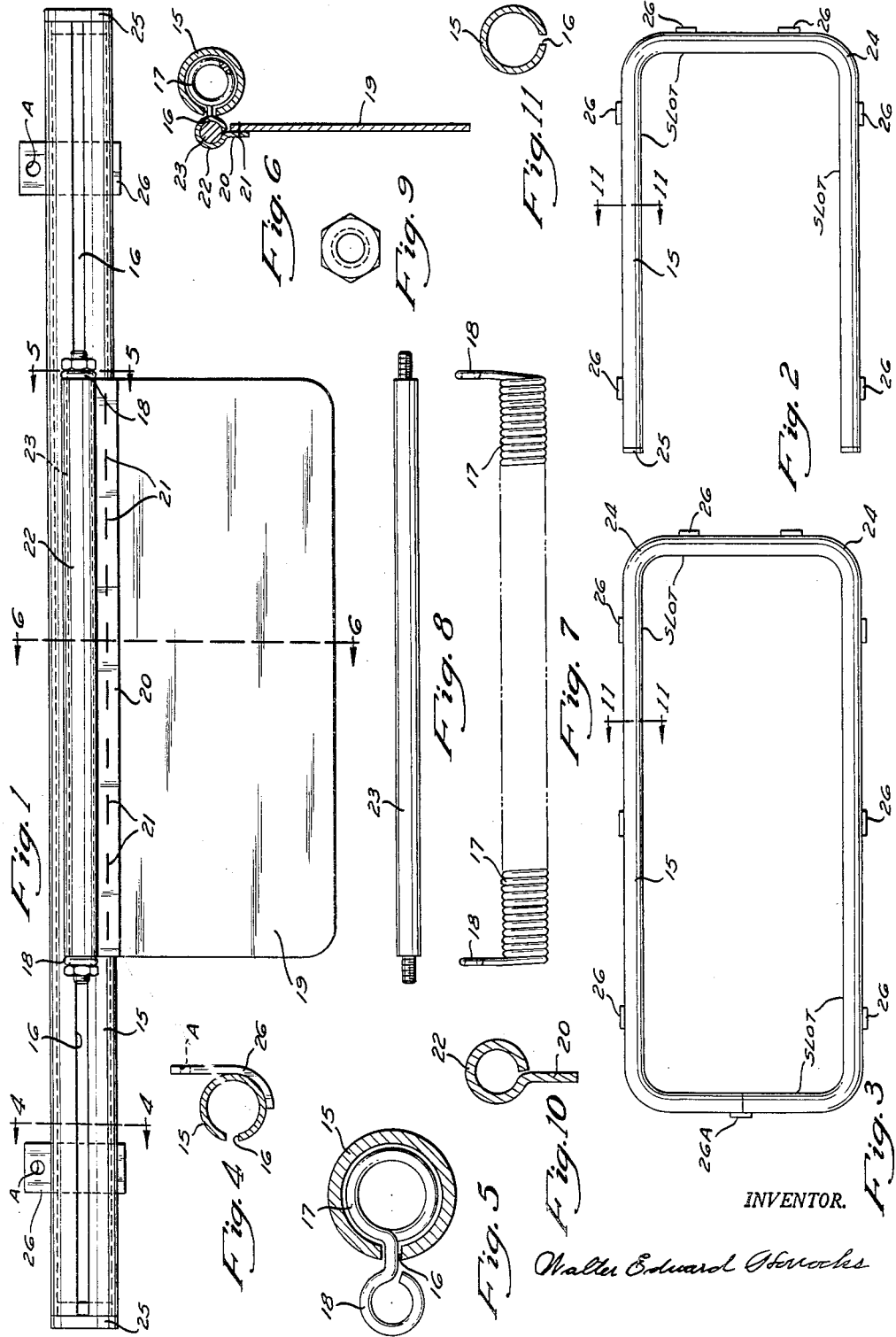
INVENTOR.
Walter Edward Horrocks

United States Patent Office 3,029,103
Patented Apr. 10, 1962

3,029,103
SUN SHADE ADJUSTING CONTRIVANCES
Walter Edward Horrocks, 1494 Rosewood Ave.,
Lakewood, Ohio
Filed Oct. 31, 1961, Ser. No. 149,485
4 Claims. (Cl. 296—97)

My present invention relates to new improvements for adjusting and arranging sun shades all around the interior of passenger carrying conveyances.

Sun shades as they are generally used in automobiles comprise two separate shades which are assembled on rods which have a swivel arrangement on one end which is assembled in a cup shaped element which is generally attached to the roof portions of automobiles, allowing of the shade to be swung towards either the left side or the right side of the swivel arrangement which supports the sun shade mechanism. In the past it has also been the custom to provide separate individual vertical rolling shades to shade rear seated passengers with the rolling shades being installed at each side window and the rear windows of automobiles and other types of passenger conveyances.

My invention provides a mechanism which is designed to provide means for the manipulation of either one or a multiple number of sun shades so that they can be shifted and adjusted all about the interior of superstructures so as to shade the sun rays from individuals located in various portions of enclosures, such as automobiles, airplanes, boats and grand stand structures, that are exposed to the rays of the sun.

Other objects will become apparent when perusing the specifications along with the accompanying drawings which form a part of this application and in which like numerals have been used to designate like parts throughout the same.

FIG. 1 illustrates a complete assembly of my invention as applied to a straight tubular element, FIG. 2 illustrates the tubular element as when formed in the shape of a letter U with rounded corners, FIG. 3 illustrates the tubular element as when formed in the shape of a parallelogram with rounded corners, FIG. 4 illustrates the tube as having brackets attached thereto for fastening the entire mechanism to supporting bodies.

FIG. 5 illustrates the end portions of the flexible coiled spring which extends through the slot in the tube and has eye portions formed thereon, FIG. 6 illustrates a cross section taken through the center portion of FIG. 1 on the line 6—6, FIG. 7 illustrates the flexible coiled spring that is inserted into the tubular elements for sliding movement therein and which has eye portions formed at the opposite end portions of the coil, FIG. 8 illustrates the round rod that carries the sun shade mechanism and has its ends threaded, FIG. 9 illustrates a threaded nut for screwing on to the ends of the rod shown in FIG. 8, FIG. 10 illustrates a round tubular carrying element having a depending flange for attaching the sun shade thereto, and FIG. 11 shows a cross section of the tubing 15 taken on the line 11—11 of FIGURES 2 and 3 respectively.

Referring now in more detail to the invention as it is illustrated herewith for illustrating preferred embodiments of the same:

A tubular element 15 has a slot 16 through one side of the tube which extends the full length of the tube with the tube having a series of hangers or brackets 26 attached to the tube 15 such as by welding or brazing the brackets 26 to the tube 15. The apertures A in the brackets 26 provide means for the insertion of anchoring elements for anchoring the entire assembled mechanisms to portions of superstructures or the side walls of enclosing structures, such as grand stands and structures that are exposed to the rays of the sun including automobiles, boats and passenger conveyances. Into the tubular element 15 the flexible coiled spring 17 is inserted for sliding movement therein with the opposite ends of the coiled spring 17 being bent so as to project through the slot 16 in the tube 15 with the ends of the spring that project through the slot 16 being formed into eyes 18 for attaching a sun shade device thereto substantially as shown in FIG. 1. The sun shade 19 has a tubular element 22 with a depending flange 20 which is stapled to the shade 19 substantially as shown at 21, in FIGURES 1 and 6. The tubular element 22 is tight fitted around the rod 23 as shown in FIG. 6 and allows the shade 19 to be rotated about the rod 23 and held in any desired position by the tight frictional contact between the rod 23 and the tube 22 allowing of the shade 19 to be pushed up out of the way when not required to be used for shading purposes.

The shade 19 is assembled to the depending flange 20 with the ends of the rod 23 extending through the eyes 18 of the spring 17 and being secured to the spring 17 by the threaded nuts substantially as is shown in FIG. 1, thereby providing for grasping the sides of the shade so as to push both the shade 19 and the spring 17 either to the right or to the left with the spring 17 being pushed in a sliding movement within the tube 15. In moving the spring 17 around the curved corners 24 shown in FIGURES 2 and 3, the flexible coils 17 stretch out while being pushed around the curved corners 24 and the coils contract together again as when the spring 17 is pushed further into the straight portions of the tube 15 as when using mechanisms such as is illustrated in FIGURES 2 and 3. In constructing the tubes 15 as shown in FIGURES 1 and 2 the open ends of the tubes 15 are closed with suitable plugs 25 tight fitted into the open ends of the tubes as shown in FIGURES 1 and 2. The shade 19 is preferably made from Masonite products or card board products although not to be limited to the use of these products, and the shade 19 together with the tube 22 may be covered over with an enveloping covering attached thereto. In constructing the tube 15 as shown in FIG. 3, the ends of the tube are butted together and held together with either a bracket or hanger 26A which is welded or brazed across the butted ends of the tube 15, which maintains the ends of the slot 16 in alignment so that the shading mechanism can be slid all around the tube 15 as when the tube 15 is formed as illustrated in FIG. 3 and a multiple number of sun shades can be assembled along the tubing 15 and be adjusted independently of each other to shade the varying shifting rays of the sun.

It is to be understood that slight changes can be made in the shapes and the arrangement of parts of the mechanism without departing from the spirit or the concept of my invention or the scope of the subjoined claims, and I reserve the right to the use of various elements for practicing my invention without departing from the concept of my invention or the scope of the subjoined claims.

Having thus described by invention as to what is new I claim as follows:

1. A device which is designed for shading the sun rays from the interior of passenger carrying conveyances and the interiors of structures that are exposed to the rays of the sun, said device comprising in combination; a tubular carrying element having a slot through one side of the element in which both edges of the slot are flat faced over their entire length and the slot extends the full length of the tubular element, a flexible coiled spring slidably mounted within the tubular element and having a portion of each end of the spring bent to extend through the slot in the tubular element, each portion that extends through the slot being bent in the shape of an eye, a round rod having reduced threaded ends providing shoulders at the opposite ends of the rod, said reduced ends extending through the said eyes, threaded nuts screwed on the ends of said round rod for securing the rod to the eyes, a rotatable tight fitted tubular element surrounding the rod and having a downwardly depending flange, a flat faced shade attached to said depending flange and adjustable about said rod together with the flanged tubular element and means for mounting the tubular carrying element within the interior of the structures to be shaded.

2. A device as claimed in claim 1, said tubular carrying element having a slot extending the full length of the tubular element and being formed in a U-shape having quadrant corners.

3. A device as claimed in claim 1, said tubular carrying element having a slot extending the full length of the tubular element and being formed in a parallelogram shape having quadrant corners.

4. A device as claimed in claim 1, said mounting means comprising a series of hangers attached to the tubular element for attaching the tubular element to the interior portions of structures that are exposed to the rays of the sun.

References Cited in the file of this patent

UNITED STATES PATENTS

| | | |
|---|---|---|
| 2,932,539 | Galbraith | Apr. 12, 1960 |
| 2,978,274 | Ordman | Apr. 4, 1961 |

FOREIGN PATENTS

| | | |
|---|---|---|
| 487,288 | Germany | Dec. 5, 1929 |
| 534,390 | Great Britain | Mar. 5, 1941 |
| 567,958 | Great Britain | Mar. 9, 1945 |
| 1,104,147 | France | June 8, 1955 |